B. R. ROZEWSKI.
PROPELLER.
APPLICATION FILED JUNE 4, 1914.

1,158,559.

Patented Nov. 2, 1915.

UNITED STATES PATENT OFFICE.

BERTOLD ROSEMAN ROZEWSKI, OF ARNHEM, NETHERLANDS.

PROPELLER.

1,158,559.  Specification of Letters Patent.  Patented Nov. 2, 1915.

Application filed June 4, 1914. Serial No. 843,094.

*To all whom it may concern:*

Be it known that I, BERTOLD ROSEMAN ROŽEWSKI, a subject of the Emperor of Austria-Hungary, residing at Velperplein 19, Arnhem, in Netherlands, have invented a new and useful Improvement in Propellers, of which the following is a specification.

The present invention relates to multiple-layered propellers, composed of laminations. The essential feature of the present invention consists therein, that in two- or three-bladed propellers, in particular ships' propellers each lamination, or single laminations, or each two laminations are reinforced by similarly shaped bodies having a greater strength than the said laminations, in such a manner, that the latter cannot lose their twist.

By the employment of reinforcing members, for example similarly shaped reinforcing laminations of a greater strength or stiffness than the wooden laminations it is made possible to construct the propeller of thin wooden laminations. This affords the advantage for screw propellers that the thin wooden leaves can be easily used for screws of any pitch, and that they will not lose their twist owing to the reinforcing laminations. This advantage was hitherto not obtainable with the multiple-layered propellers known until now.

The propeller may also be provided with a sheathing. In case of such sheathed propellers it will be advisable to let the reinforcing laminations project and to utilize the thus projecting edges for securing the sheathing, for example by means of welding, beading or the like. Thereby a body is obtained which has a very great strength at a comparatively small weight, as the reinforcing laminations act as stiffening webs for the sheathing. With wide bladed propellers it will be preferable to let the seams extend parallel to the axis.

In the accompanying drawing an embodiment of the invention is shown by way of example.

Figure 1:
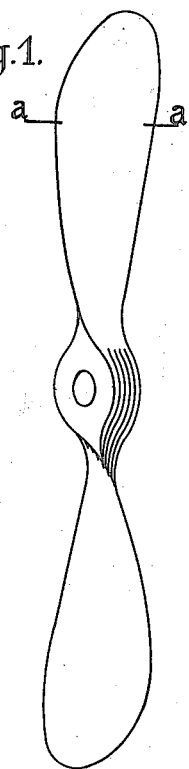
Figure 4:
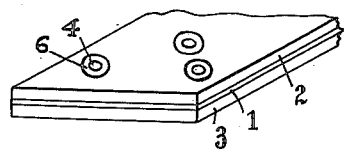
Figure 3:
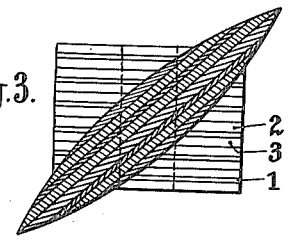
Figure 2:
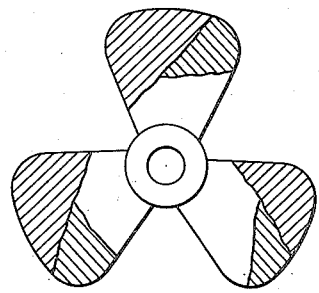
Figure 5:

Figure 1 is a front view of a two-bladed propeller twisted to a screw, seen from in front. Fig. 2 is a view of a three-bladed propeller. Fig. 3 is a section through a propeller on the line *a—a* in Fig. 1. Fig. 4 shows a single element of the propeller. Fig. 5 illustrates a way the sheathing may be secured to the propeller blade.

In all cases the reinforcing members consist of bodies which have a greater strength or stiffness than the laminations, for example which are made of cross grained material, of metal or the like, and which are shaped similar to the wooden leaves 2, 3. For screw propellers it is preferable to give the blades such a twist, that the direction of all joints between the wooden laminations and the equally twisted reinforcements is parallel to the longitudinal axis of the cross section (see Fig. 3). This will allow of obtaining large contact surfaces between the neighboring laminations.

The propeller is preferably built up of elements as exemplified in Fig. 4. Each element is composed of two wooden leaves 2, 3 with the reinforcing leaf 1 therebetween, which consists, for example, of a smooth or corrugated piece of sheet metal. The three leaves are preferably secured to each other by means of rivets 4, or the like, when the reinforcement is made of metal. In such case the washers 6 on the rivets 4 are countersunk. When the reinforcement is made of wood, it is glued or similarly secured to the other leaves 2, 3. Several such elements are then arranged behind each other, whereupon the adjoining wooden leaves are glued together. In such a manner two- or more-bladed propellers are constructed, which are particularly adapted as ship's propellers, and which consists of wooden leaves twisted to a screw and alternating rigid intermediate leaves, and in which all joints of the wooden leaves and also of the rigid intermediate reinforcing leaves are arranged parallel to the longitudinal axis of the cross section, so that it is impossible for the laminations to lose their twist.

In the constructional form according to Fig. 5 the propeller is either wholly or partly covered with a sheathing 5, which may be made, for example, of metal, and is rigidly secured to the projecting edges of the reinforcing leaves 1, say by welding.

Propellers constructed in the hereinbefore described manner combine a small weight with a great strength and stiffness and allow of being used as air-propellers, water-propellers and the like more.

I claim:

1. Multiple-layered propeller composed of wooden laminations, the said laminations reinforced by similarly shaped laminations of a greater strength, adapted to prevent the wooden laminations losing their twist.

2. Multiple-layered propeller composed of wooden laminations, the said laminations reinforced in pairs by similarly shaped laminations of a greater strength, adapted to prevent the wooden laminations losing their twist.

3. Multiple-layered propeller composed of wooden laminations, the said laminations reinforced by similarly shaped laminations of a greater strength, adapted to prevent the wooden laminations losing their twist, the joints between the several laminations extending parallel to the longitudinal axis of any cross section through the propeller blade.

4. Multiple-layered propeller composed of wooden laminations, the said laminations reinforced by similarly shaped laminations of a greater strength, adapted to prevent the wooden laminations losing their twist, the said reinforcing laminations having projecting edges, and a sheathing secured to said projecting edges.

5. Multiple-layered propeller composed of a plurality of elements, said elements each composed of two wooden leaves with a metallic reinforcing leaf therebetween, said three leaves riveted together by rivets and countersunk washers on said rivets, said elements suitably secured to each other, the said reinforcing leaves having projecting edges, and a sheathing secured to said projecting edges.

BERTOLD ROSEMAN ROZEWSKI.

Witnesses:
 IVAN RASP,
 E. W. NABEL.